United States Patent
Ipponyari

(10) Patent No.: US 6,549,296 B2
(45) Date of Patent: *Apr. 15, 2003

(54) METHOD AND APPARATUS FOR SIMULTANEOUS MULTICASTING TO A PLURALITY OF DESTINATIONS

(75) Inventor: Tadanori Ipponyari, Sanada-machi (JP)

(73) Assignee: Matsushita Graphic Communication Systems, Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 09/092,867

(22) Filed: Jun. 8, 1998

(65) Prior Publication Data

US 2001/0043356 A1 Nov. 22, 2001

(30) Foreign Application Priority Data

Jun. 10, 1997 (JP) ............................... 9-167989

(51) Int. Cl.⁷ ............................ G06F 15/00; H04N 1/00
(52) U.S. Cl. ...................... 358/1.15; 358/407; 358/440
(58) Field of Search .................. 358/1.15, 407, 358/402, 403, 434, 437, 440; 370/432; 379/100.01

(56) References Cited

U.S. PATENT DOCUMENTS

| | | | |
|---|---|---|---|
| 4,994,926 A | * | 2/1991 | Gordon et al. ............ 358/400 |
| 5,084,770 A | * | 1/1992 | Nakayama ................ 358/403 |
| 5,392,133 A | | 2/1995 | Nakajima |
| 5,428,457 A | | 6/1995 | Okumura et al. |
| 5,559,611 A | * | 9/1996 | Bloomfield et al. ....... 358/407 |
| 5,734,704 A | * | 3/1998 | Matsueda et al. ....... 379/100.14 |
| 5,852,500 A | * | 12/1998 | Yoshino ................... 258/440 |

FOREIGN PATENT DOCUMENTS

| | | | |
|---|---|---|---|
| EP | 511467 | 11/1992 | |
| GB | 2312131 | 10/1997 | |
| JP | 4-107040 | 4/1982 | ............ H04M/1/27 |
| JP | 3-139966 | 6/1991 | ............ H04N/1/32 |
| JP | 5-14669 | 1/1993 | ............ H04N/1/32 |
| JP | 3-130566 | 5/1997 | ............ H04N/1/32 |
| JP | 9-130566 | 5/1997 | |

OTHER PUBLICATIONS

Takahiko et al. Facsimile Intelligent Communication System FICS–1; Jul.–Aug. 1981.*

* cited by examiner

Primary Examiner—Thomas D. Lee
(74) Attorney, Agent, or Firm—Greenblum & Bernstein, P.L.C.

(57) ABSTRACT

A destination to which a line connection is not established is memorized in the process of simultaneous multicasting to a plurality of destinations. When another multicast communication starts, if the memorized destination is included in destinations, a call is primarily performed to a destination in the next order by skipping the memorized destination.

15 Claims, 16 Drawing Sheets

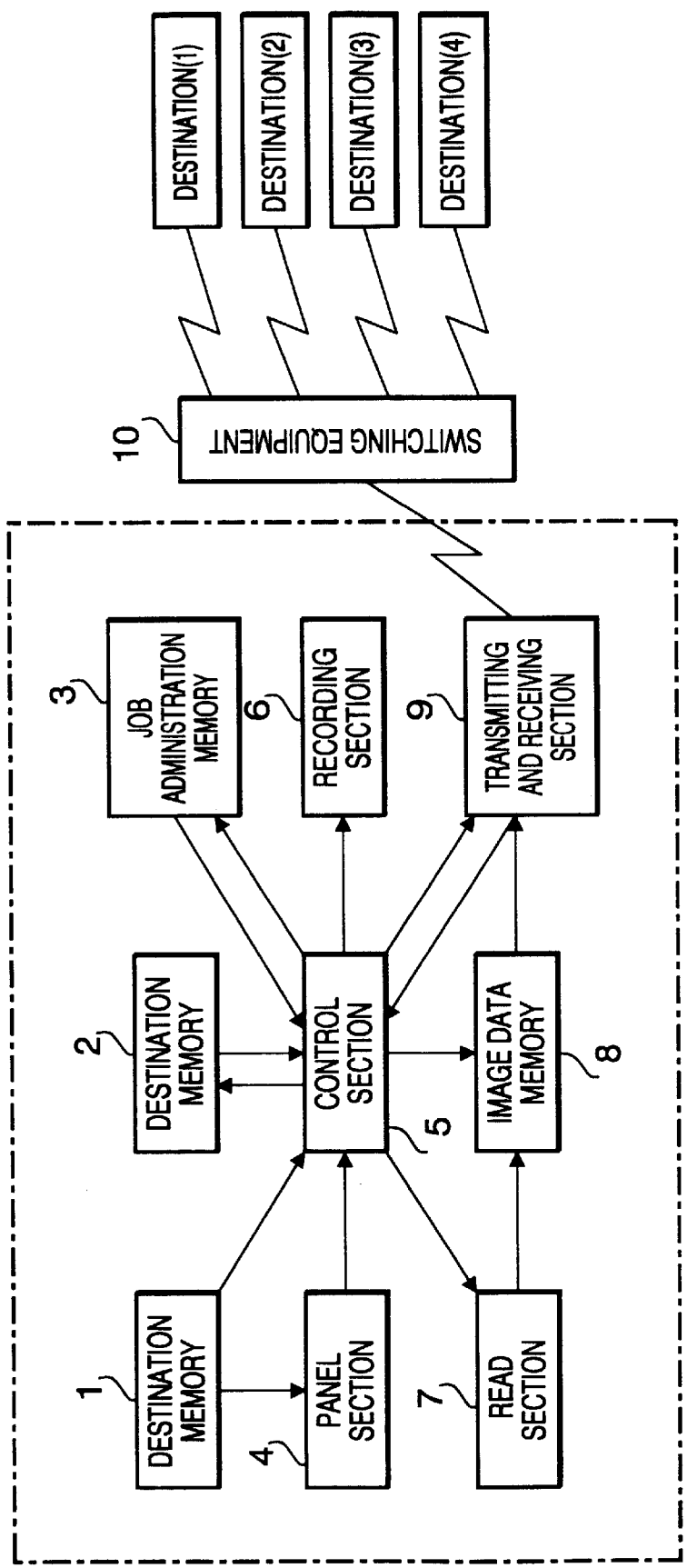

FIG. 5

JOB ADMINISTRATION FILE

| FILE NUMBER | 001 | | |
|---|---|---|---|
| COMMUNICATION CONDITION | REDIAL INTERVAL | | |
| CALL TIME | 10 O'CLOCK 03 MINUTE | | |
| CALL DESTINATION | D(1) | ERROR INFORMATION | COMPLETED |
| | POINTER | LEFT CALL NUMBER | 0 |
| | D(2) | ERROR INFORMATION | BUSY |
| | | LEFT CALL NUMBER | 2 |

FIG. 6

DESTINATION MEMORY

| | TELEPHONE NUMBER |
|---|---|
| D(1) | 301 |
| D(2) | 302 |
| D(3) | 303 |
| D(4) | 304 |
| D( ) | |
| D( ) | |
| D(n) | *** |

FIG. 14A

JOB - A : D (1) WHEN FINISHED

JOB A

| FILE NUMBER | 001 | |
|---|---|---|
| COMMUNICATION CONDITION | IN PROGRESS | |
| CALL TIME | O'CLOCK MINUTE | |
| CALL DESTINATION | D(1) | COMPLETED |
| | | 0 |
| | D(2) POINTER | 3 |

JOB B

| FILE NUMBER | 002 | |
|---|---|---|
| COMMUNICATION CONDITION | ON HOLD TO EXECUTE | |
| CALL TIME | O'CLOCK MINUTE | |
| CALL DESTINATION | D(2) POINTER | 3 |
| | D(3) | 3 |

FIG. 14B

JOB - A : D (2) WHEN FINISHED, JOB - B WHEN CALLING

JOB A

| FILE NUMBER | 001 | |
|---|---|---|
| COMMUNICATION CONDITION | REDIAL INTERVAL | |
| CALL TIME | 10 O'CLOCK 03 MINUTE | |
| CALL DESTINATION | D(1) POINTER | COMPLETED |
| | | 0 |
| | D(2) | BUSY |
| | | 2 |

JOB B

| FILE NUMBER | 002 | |
|---|---|---|
| COMMUNICATION CONDITION | ON HOLD TO EXECUTE | |
| CALL TIME | O'CLOCK MINUTE | |
| CALL DESTINATION | D(2) | 3 |
| | D(3) POINTER | 3 |

FIG. 14C

JOB - A : D (3) WHEN FINISHED

JOB A

| FILE NUMBER | 001 | |
|---|---|---|
| COMMUNICATION CONDITION | REDIAL INTERVAL | |
| CALL TIME | 10 O'CLOCK 03 MINUTE | |
| CALL DESTINATION | D(1) POINTER | COMPLETED |
| | | 0 |
| | D(2) | BUSY |
| | | 2 |

JOB B

| FILE NUMBER | 002 | |
|---|---|---|
| COMMUNICATION CONDITION | IN PROGRESS | |
| CALL TIME | O'CLOCK MINUTE | |
| CALL DESTINATION | D(2) POINTER | 3 |
| | D(3) | COMPLETED |
| | | 0 |

FIG. 15A

JOB – B : D (2) WHEN FINISHED, JOB – A BEFORE CALLING

JOB A

| FILE NUMBER | 001 | | |
|---|---|---|---|
| COMMUNICATION CONDITION | REDIAL INTERVAL | | |
| CALL TIME | O'CLOCK MINUTE | | |
| CALL DESTINATION | D(1) | COMPLETED | |
| | | 0 | |
| | D(2) | BUSY | |
| | POINTER | 2 | |

JOB B

| FILE NUMBER | 002 | | |
|---|---|---|---|
| COMMUNICATION CONDITION | IN PROGRESS | | |
| CALL TIME | O'CLOCK MINUTE | | |
| CALL DESTINATION | D(2) | COMPLETED | |
| | POINTER | 0 | |
| | D(3) | COMPLETED | |
| | | 0 | |

FIG. 15B

JOB – A : D (2) WHEN FINISHED

JOB A

| FILE NUMBER | 001 | | |
|---|---|---|---|
| COMMUNICATION CONDITION | REDIAL INTERVAL | | |
| CALL TIME | O'CLOCK MINUTE | | |
| CALL DESTINATION | D(1) | COMPLETED | |
| | | 0 | |
| | D(2) | COMPLETED | |
| | POINTER | 0 | |

JOB B

| FILE NUMBER | 002 | | |
|---|---|---|---|
| COMMUNICATION CONDITION | IN PROGRESS | | |
| CALL TIME | O'CLOCK MINUTE | | |
| CALL DESTINATION | D(2) | COMPLETED | |
| | POINTER | 0 | |
| | D(3) | COMPLETED | |
| | | 0 | |

FIG. 16A

JOB − A : D (1) WHEN FINISHED

JOB A

| FILE NUMBER | 001 | | |
|---|---|---|---|
| COMMUNICATION CONDITION | IN PROGRESS | | |
| CALL TIME | O'CLOCK MINUTE | | |
| CALL DESTINATION | D(1) | BUSY | |
| | | 2 | |
| | D(2) | | |
| | POINTER | 3 | |

JOB B

| FILE NUMBER | 002 | |
|---|---|---|
| COMMUNICATION CONDITION | ON HOLD TO EXECUTE | |
| CALL TIME | O'CLOCK MINUTE | |
| CALL DESTINATION | D(3) | |
| | POINTER | 3 |
| | D(4) | |
| | | 3 |

FIG. 16B

JOB − A : D (2) FINISHED

JOB A

| FILE NUMBER | 001 | | |
|---|---|---|---|
| COMMUNICATION CONDITION | IN PROGRESS | | |
| CALL TIME | O'CLOCK MINUTE | | |
| CALL DESTINATION | D(1) | BUSY | |
| | | 2 | |
| | D(2) | LINE TERMINATION | |
| | POINTER | 2 | |

JOB B

| FILE NUMBER | 002 | |
|---|---|---|
| COMMUNICATION CONDITION | ON HOLD TO EXECUTE | |
| CALL TIME | O'CLOCK MINUTE | |
| CALL DESTINATION | D(3) | |
| | POINTER | 3 |
| | D(4) | |
| | | 3 |

FIG. 16C

JOB − A : D (3) WHEN FINISHED

JOB A

| FILE NUMBER | 001 | |
|---|---|---|
| COMMUNICATION CONDITION | REDIAL INTERVAL | |
| CALL TIME | 10 O'CLOCK 03 MINUTE | |
| CALL DESTINATION | D(1) | BUSY |
| | POINTER | 2 |
| | D(2) | COMPLETED |
| | | 0 |

JOB B

| FILE NUMBER | 002 | |
|---|---|---|
| COMMUNICATION CONDITION | ON HOLD TO EXECUTE | |
| CALL TIME | O'CLOCK MINUTE | |
| CALL DESTINATION | D(3) | |
| | POINTER | 3 |
| | D(4) | |
| | | 0 |

FIG. 17A

JOB - B : D (3) WHEN FINISHED

JOB A

| FILE NUMBER | 001 | | |
|---|---|---|---|
| COMMUNICATION CONDITION | REDIAL INTERVAL | | |
| CALL TIME | 10 O'CLOCK 03 MINUTE | | |
| CALL DESTINATION | D(1) | BUSY | |
| | POINTER | 2 | |
| | D(2) | COMPLETED | |
| | | 0 | |

JOB B

| FILE NUMBER | 002 | |
|---|---|---|
| COMMUNICATION CONDITION | IN PROGRESS | |
| CALL TIME | O'CLOCK MINUTE | |
| CALL DESTINATION | D(3) | IMPROPER PASSWORD |
| | | 0 |
| | D(4) | |
| | POINTER | 3 |

FIG. 17B

JOB - B : D (4) WHEN FINISHED

JOB A

| FILE NUMBER | 001 | | |
|---|---|---|---|
| COMMUNICATION CONDITION | REDIAL INTERVAL | | |
| CALL TIME | 10 O'CLOCK 03 MINUTE | | |
| CALL DESTINATION | D(1) | BUSY | |
| | POINTER | 2 | |
| | D(2) | COMPLETED | |
| | | 0 | |

JOB B

| FILE NUMBER | 002 | |
|---|---|---|
| COMMUNICATION CONDITION | FINISHED | |
| CALL TIME | O'CLOCK MINUTE | |
| CALL DESTINATION | D(2) | IMPROPER PASSWORD |
| | | 0 |
| | D(3) | COMPLETED |
| | POINTER | 0 |

METHOD AND APPARATUS FOR SIMULTANEOUS MULTICASTING TO A PLURALITY OF DESTINATIONS

BACKGROUND OF THE INVENTION

1. Field of the Invention

The present invention relates to a multicast method and apparatus applicable to a communication apparatus such as telephone and facsimile with the multicast communication function and the redial function.

2. Description of the Related Art

In some of facsimile, telephone numbers of communication partners can be assigned and registered for a one touch button and a short number function. In a facsimile with the multicast communication function, a plurality of destinations of communication partners for the multicast communication are assigned for a one touch button or the short number function, and the number of destinations capable of being registered at the same time for a one touch button or the short number function reaches tens up to hundreds. And in a facsimile apparatus with the multicast communication function, a plurality of jobs for the multicast communication can be registered. Some of such apparatus have the sequential transmission function in which one multicast communication starts while another one is hold for redial.

The communication procedure, in the case where a plurality of jobs for multicast communication are registered in a facsimile, is explained. FIG. 1A illustrates the case where the multicast communication (Job A) for multicasting paper document A to reception terminals D(1) and D(2), and the multicast communication (Job B) for multicasting paper document B to reception terminals D(2) and D(3) are registered, and reception terminal D(2) is in a busy condition.

In Job A, a redial interval occurs in the middle of Job A because reception terminal D(2) is busy and not available for the line connection. In Job B started during the redial interval, a call is performed to reception terminal D(2) registered at the head of Job B. In the case where reception terminal D(2) is still busy, a call is changed to terminal D(3) of the next order because the line connection is not established as well as Job A. When a call is performed to reception terminal D(3) and the line connection is established, paper document B is transmitted. When the calls to all reception terminals registered in Job B are finished, if reception terminal D(2) to which the transmission is not completed because of busy condition is left, Job B is on hold to redial to it.

In Job A, after the redial interval passes, a call is performed again to reception terminal D(2) to which a transmission is not performed. In the example illustrated in FIG. 1A, the busy condition of reception terminal D(2) is dissolved during the redial interval, the transmission is completed and the job is finished. In Job B, after the redial interval passes, a call is performed to reception terminal D(2) to which the transmission is not performed and paper document B is transmitted.

FIG. 3A illustrates the case where two jobs are registered, where one is the multicast communication (Job A) for multicasting paper document A to reception terminals D(1) and D(2) by password transmission and another one is the multicast communication (Job B) for multicasting paper document B to reception terminals D(3) and D(4) by password transmission, reception terminal D(1) is in a busy condition, reception terminal D(2) is in an error condition caused by a line termination and reception terminal D(3) is in an improper password condition.

In job A, a communication error is caused in the middle of the communication to reception terminal D(2) by a line termination, a call is performed to reception terminal D(2) again immediately, and a transmission is performed. The redial interval is set for reception terminal D(1) to which a communication is not performed because of busy condition.

On the other hand, Job B is started when a condition of Job A changes to the redial interval. In Job B, a password is transmitted to reception terminal D(3) and a communication error occurs because the password is improper. A call is repeated to reception terminal D(3) in a communication error, and a call destination is changed to the next one; reception terminal D(4) after a certain number of continuously communication errors occur.

In the facsimile apparatus described above, the case occurs where, while one user is performing a multicast communication in which a plurality of destinations are registered, another user may register another multicast communication. In this case, the same destination as that registered in the multicast communication already performed may be overlapped and selected as a destination (D(2)) for the multicast communication registered later. When a line connection is not established to destination (D(2)) because of busy condition and a redial interval for that is set by the first job, if a call is performed to destination (D(2)) by another multicast communication job registered later, it is obvious that the communication is not established and the job enters the redial interval. As a result, at least two redial interval occurs until two multicast communications finish, which means it takes a long time to finish transmissions.

And in the facsimile apparatus described above, when a communication error occurs, a call is performed repeatedly so that the transmission is completed. However in the case where a communication error is caused by an improper password for a destination, it is impossible to establish a communication to the same destination by calling repeatedly a numbers of times. Because of it, it takes a time to move to the next destination, which requires a long time to finish the multicast communication for all destinations.

In a manner described above, in a communication apparatus represented by a facsimile apparatus with the multicast communication function and the redial function, since a call is performed repeatedly to a destination to which a connection or a communication is impossible until one multicast communication is finished to all destinations, that may allow unnecessary high occupation rate of line.

SUMMARY OF THE INVENTION

The present invention is carried out based on the facts described above and has the object to provide a multicast method and apparatus capable of saving a duration time consumed to finish a multicast communication for all destinations and preventing the occupation of line by the multicast communication, by calling primarily to a destination to which a connection or a communication is possible.

In a simultaneous multicast method in the present invention, a destination to which a line connection fails in the process of simultaneous multicast to a plurality of destinations is memorized, and when the memorized destination is included in another multicast communication stared later, a call to the destination is skipped and a call to another destination is primarily performed.

According to the present invention, in the case where a destination to which a line connection fails in the former multicast communication is included in the later multicast communication, a call to such destination is skipped. For instance, in the case where the connection is not established by busy condition, a call can be performed after the possibility of busy condition lowers, which permits to finish a job in a shorter time.

And in a simultaneous multicast method of the present invention, when a communication error occurs in the process of simultaneous multicasting to a plurality of destinations, in the case where a communication error to a destination is caused by the reason proper to call again, a call is repeated to the same destination, and in the case where a communication error to a destination is caused by the reason improper to call again, a call to the same destination is prevented. That is to say, a call is performed again to a recommunicatable destination, and a call is not performed again to an inrecommunicatable destination.

According to the present invention, in the case where a communication error to a destination is caused by the reason improper to call again, a call to the same destination is not performed without useless calls. For instance in the case where a communication error is caused by an improper password, useless calls to the same destination are omitted. That results in reducing the time consumed to finish all of a plurality of multicast communications.

And the present invention provides a multicast communication apparatus comprising a multicast function to simultaneous multicast to a plurality of destinations, a redial function to set the redial interval for a destination to which a connection is not established, a memory in which error information of the destination to which a connection is not established is memorized, a delete function to delete the error information of the destination to which a connection is not established once then completed in the memory, a sequence function to start a plurality of multicast communications sequentially during the redial interval, and a function to control the call order to skip the destination which error information is registered in the memory.

And the present invention provides a communication apparatus comprising a multicast function to simultaneous multicast to a plurality of destinations, a redial function to set the redial interval for a destination to which a connection is not established, a sequence function to start a plurality of multicast communications sequentially during the redial interval, a memory in which the error type of the occurred communication error is memorized and a function to control not to call again the destination which error type is memorized as an inrecommunicatable one in the memory.

And the present invention provides a communication apparatus for multicast communicating comprising a function to simultaneous multicast the same paper document to a plurality of destinations, a function to set a redial interval for a destination to which a connection is not established for each paper document, a control section to control a call order, when a plurality of simultaneous multicasts are performed, in the case where a destination set a redial interval in a simultaneous multicast is included in destinations in another simultaneous multicast, to skip the destination in another simultaneous multicast.

And the present invention provides a communication apparatus for multicast communicating comprising a function to simultaneous multicast the same paper document to a plurality of destinations, a function to memorize an error information concerning a destination to which a connection is not established for each paper document, and a control section not to call to a destination which error type is memorized as an inrecommunicatable one in a simultaneous multicast and to shift to another simultaneous multicast processing when a plurality of simultaneous multicasts are performed.

BRIEF DESCRIPTION OF THE DRAWINGS

FIG. 4 is a function diagram of a communication apparatus in the above embodiment of the present invention;

FIG. 5 is configuration diagram of a fob administration file at a communication apparatus in the above embodiment of the present invention;

FIG. 6 is a configuration diagram of a destination memory at a communication apparatus in the above embodiment of the present invention;

FIGS. 14A, 14B, and 14C are condition transition diagrams of the first part of the job administration file at a call pattern in FIG. 1B in the above embodiment of the present invention;

FIGS. 15A and 15B are condition transition diagrams of the last part of the job administration file at a call pattern in FIG. 1B in the above embodiment of the present invention;

FIGS. 16A, 16B, and 16C are condition transition diagrams of the first part of the job administration file at a call pattern in FIG. 3B in the above embodiment of the present invention; and FIGS. 17A and 17B are condition transition diagrams of the last part of the job administration file at a call pattern in FIG. 3B in the above embodiment of the present invention.

DESCRIPTION OF THE PREFERRED EMBODIMENT

An embodiment of a communication apparatus according to the present invention is concretely explained with reference to drawings.

Figure 1A:
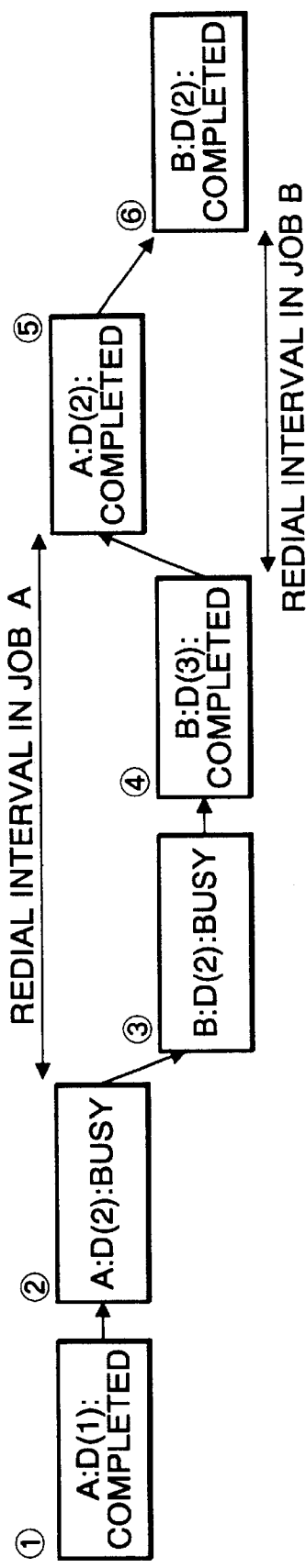
FIG. 1A is a sequence diagram illustrating a conventional first call sequence.
Figure 1B:
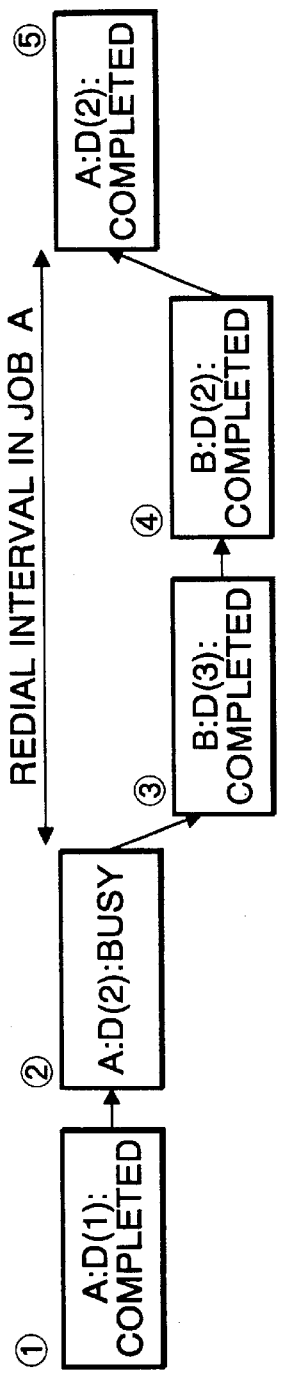
FIG. 1B is a sequence diagram illustrating a first call sequence in the embodiment of the present invention.
Figure 2A:
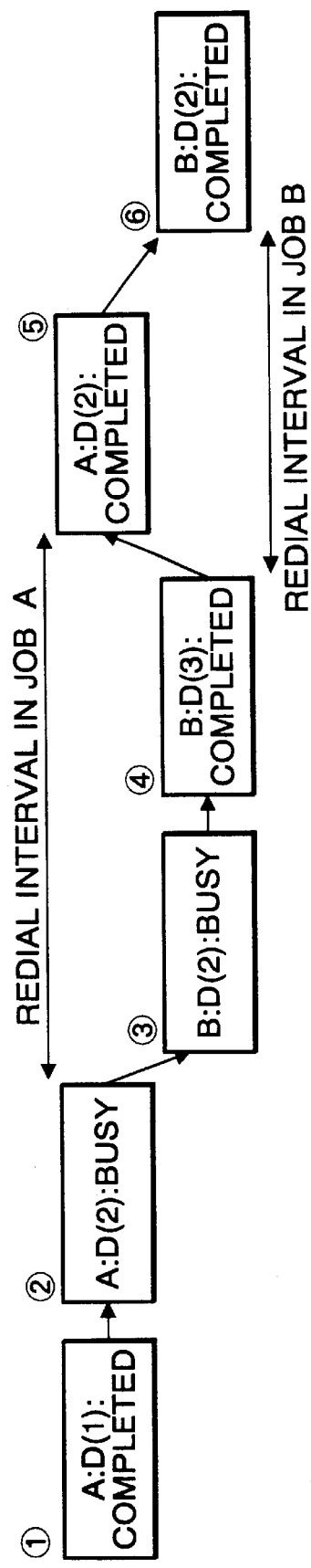
FIG. 2A is a sequence diagram illustrating a conventional second call sequence.
Figure 2B:
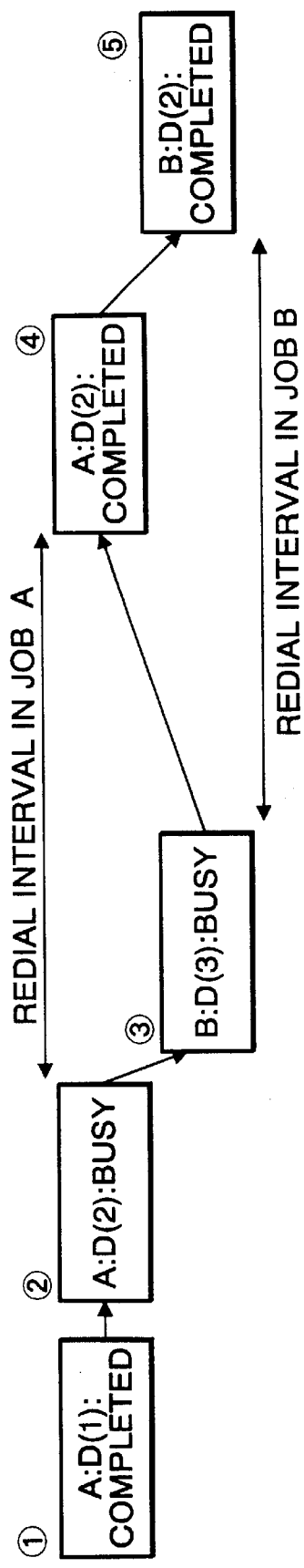
FIG. 2B is a sequence diagram illustrating a second call sequence in the above embodiment of the present invention.
Figure 3A:
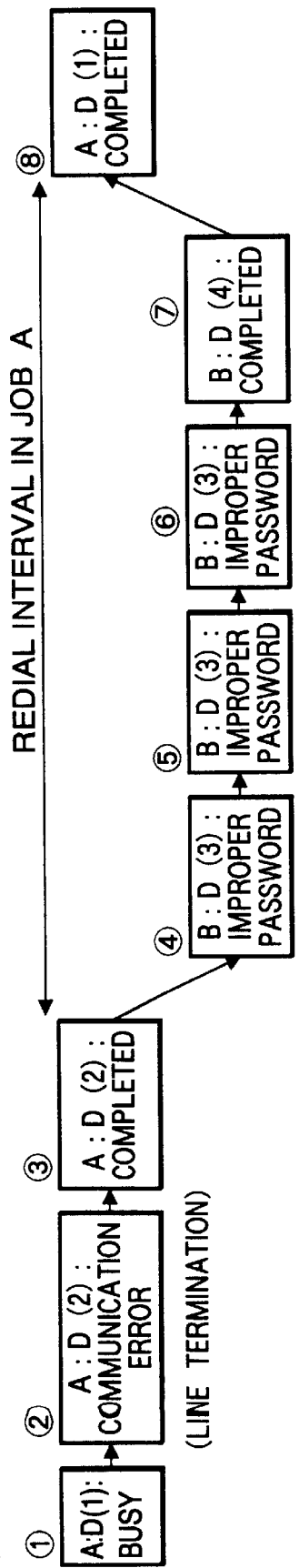
FIG. 3A is a sequence diagram illustrating a conventional third call sequence.
Figure 3B:
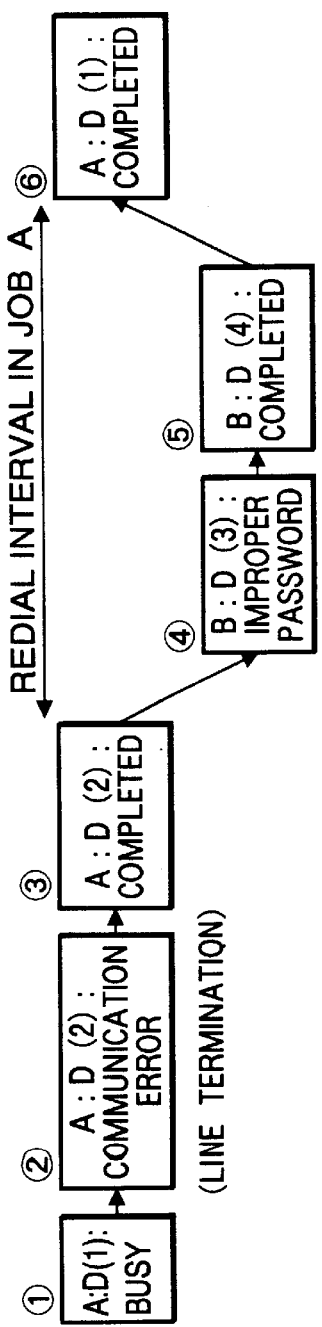
FIG. 3B is a sequence diagram illustrating a third call sequence in the above embodiment of the present invention.

FIG. 1B, FIG. 2B and FIG. 3B illustrate call sequences in the case where a plurality of multicast communications are registered at a communication apparatus in the embodiment of the present invention.

In a call sequence illustrated in FIG. 1B, destination D(2), to which a connection is not established because of a busy condition in a multicast communication (job A) already started, is memorized. Then in the case where destination D(2) to be called is detected as in a busy condition when another multicast communication (job B) starts, a call is performed to the next registered destination D(3) to skip destination D(2)(in another multicast communication (job B)). A call to destination D(2) skipped because of the busy detection is performed in the end of job B. At the time when a call to the final destination is finished in job B, if there is a job in which a destination on hold for redial (job A in this case) is registered or another registered multicast communication (no multicast communication except job A and job B is registered in this case), after the redial interval passes, job A starts again and a call to the destination D(2) on hold for redial is performed. Otherwise the job shifts another registered multicast communication job.

In a call sequence illustrated in FIG. 2B, destination D(2), to which a connection is not established because of a busy condition in a multicast communication (job A) already started, is memorized. Then in the case where destination D(2) to be called is detected as in a busy condition when another multicast communication (job B) starts, a call is performed to the next registered destination D(3) to skip destination D(2)(in another multicast communication (job B)). After a call to the last destination D(3) is finished by skipping destination D(2) because of the busy detection, the redial to destination D(2) skipped without a call to destination D(2) is registered (in job B). Then the job shifts to a job in which a destination hold for redial (job A in this case) is registered previously or another registered multicast communication job (no multicast communication except job A and job B is registered in this case).

In a call sequence illustrated in FIG. 3B, a communication errors occur in multicast communications (job A and job B) by line termination (call 2 in job A) and improper password (call 4 in job B). An error type is identified, and a call is performed immediately to destination D(2), which error type of line termination suggests that recommunication is possible. (An error type is identified, and when it suggests that recommunication is possible, for instance line termination, a call is performed immediately to a destination having such error type, in this case, to destination D(2)). And a call is not performed to a destination D(3) which error type of improper password suggests that recommunication is impossible, and a call is performed to the next destination D(4). (And when the error type suggests that recommunication is impossible, for instance improper password, a call is not performed to a destination having such error type, in this case, to destination D(3), and a call is performed to the next destination D(4).)

FIG. 4 illustrates function blocks of a communication apparatus in the embodiment of the present invention.

The communication apparatus illustrated in the figure comprises destination memory 1 in which destination information including telephone numbers of destinations assigned for a one touch button and a short number function are memorized, destination memory 2 to which destination information of destinations registered at a multicast communication is loaded from destination memory 1, job administration memory 3 in which a job administration file of a multicast communication is memorized, panel section 4 which a user operates, control section 5 to provide various controls including a control of call sequences described above, recording section 6 to record reception image data and so on, read section to read a transmitted paper, image data memory 8 in which the image data for the read paper is memorized and transmitting and receiving section 9. The communication apparatus is connected by line to each destination, D(1) up to D(4) via switching equipment 10.

FIG. 5 illustrates a configuration of a job administration file.

In a job administration file, job administration information is registered, which includes file number provided when a user registers a multicast communication, a communication condition of the job, call time, call destination registered by using a short number function and the like, error information caused in a call to a destination and left call numbers.

FIG. 6 illustrates a data configuration of destination memory 1. As illustrated in the figure, a plurality of destinations assigned and registered for a one touch button or a short number function and the corresponding telephone numbers are memorized.

Figure 7:
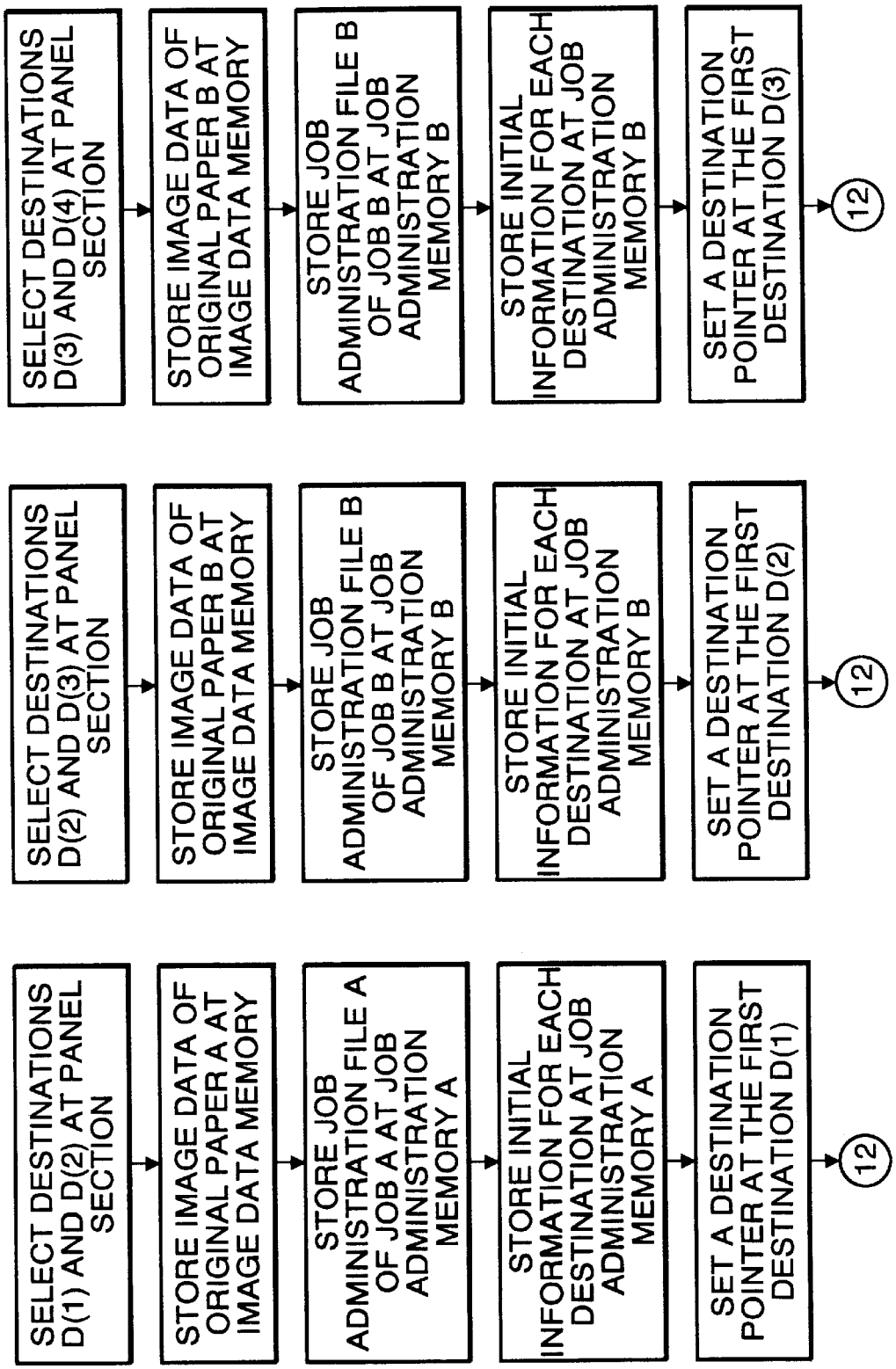
FIG. 7A is a flow chart for the job A registration (to register job A) in the above embodiment of the present invention.
FIG. 7B is a flow chart for the job B registration (to register job B) in the above embodiment of the present invention.
FIG. 7C is a flow chart for the job B registration with password transmission (to register job B for transmitting with a password) in the above embodiment of the present invention.
Figure 13:
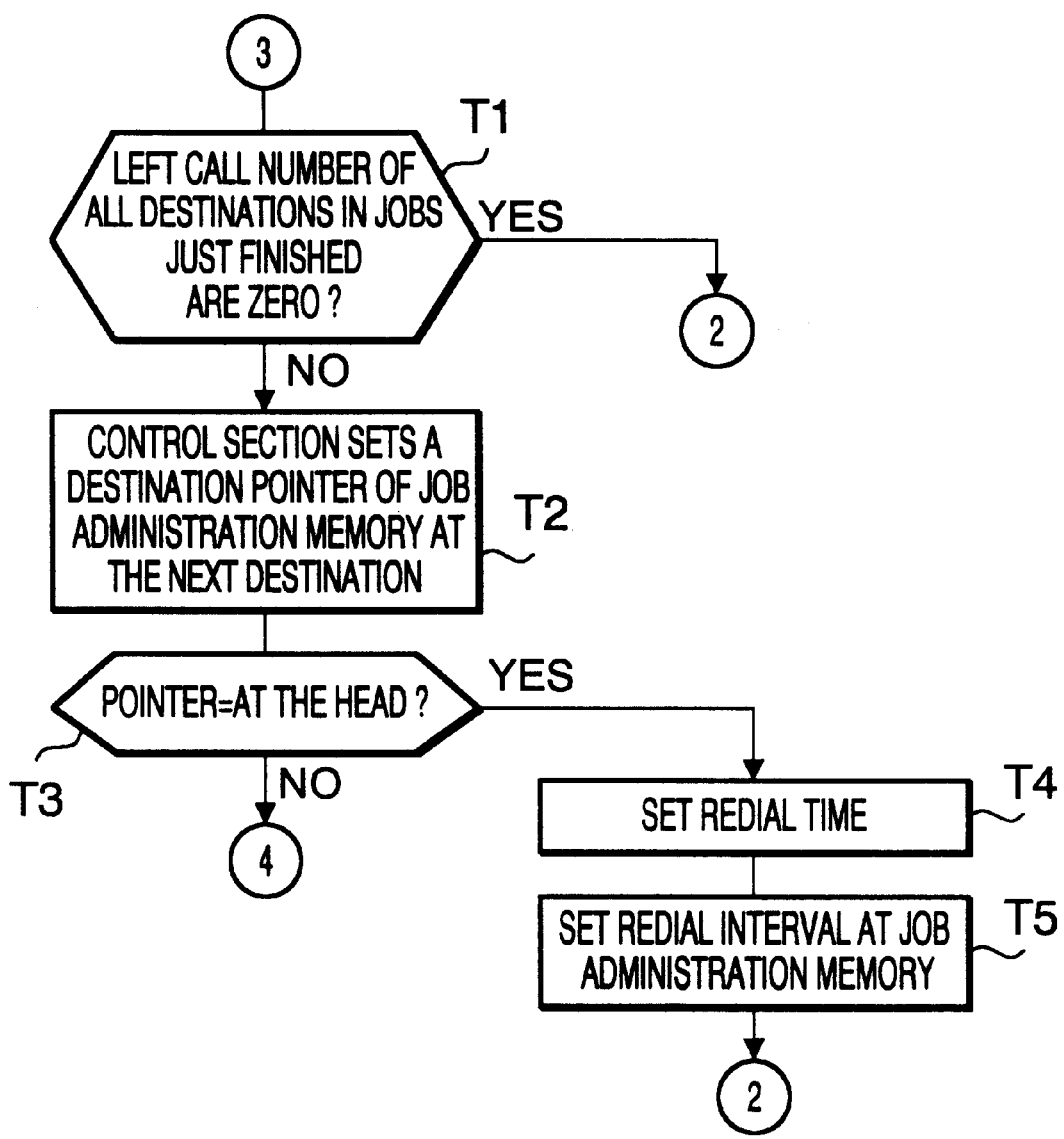
FIG. 13 is another flow chart replaced with that in FIG. 12.

Next the operations of the communication apparatus configured as described above are explained in detail with flow charts in FIG. 7 up to FIG. 13.

As illustrated in FIG. 1B, in the case of multicast communicating paper document A to reception terminal D(1) and D(2), a user sets paper document A at read section 7, selects the multicast communication function and inputs reception terminals D(1) and D(2) by using the short number function or the like at panel section 4. By selecting the multicast communication function at operating panel section 4, one multicast communication (job) is registered. And after a job is registered, by selecting a reception terminal in operating panel section 4, the selected reception terminal is registered to the job.

The above operation content is provided from panel section 4 to control section 5, then the multicast communication is registered as job A based on the flow chart in FIG. 7A. That is, D(1) and D(2) are selected from destination memory 1 as a destination for the multicast communication, while paper document A is read at read section 7 and stored at image data memory 8. Control section 5 generates job A for the selected destination and the image data of the stored paper document A. The file number is set at the job administration file of job A and stored at job administration memory 3. And the initial information for each destination is stored at job administration file A at job administration memory 3 and the destination pointer is set at the first destination D(1).

And in the case of multicast communicating paper document B to reception terminal D(2) and D(3), a user sets paper document B at read section 7, selects the multicast communication function and inputs reception terminals D(2) and D(3) by using the short number function or the like at panel section 4.

The above operation content is provided from panel 4 to control section 5, then the multicast communication is registered as job B based on the flow chart in FIG. 7B. That is, D(2) and D(3) are selected from destination memory 1 from registered destinations, while paper document B is read at read section 7 and stored at image data memory 8. Control section 5 generates job B for the selected destination and the image data of the stored paper document B. The file number is set at the job administration file of job B and stored at job administration memory 3. And the initial information for each destination is stored at job administration file B at job administration memory 3 and the destination pointer is set at the first destination D(2).

And as illustrated in FIG. 3B, in the case of multicast communicating by password transmission paper document A to reception terminals D(1) and D(2), the multicast communication is prepared according to the flow chart illustrated in FIG. 7A in the similar manner with the above-mentioned case. Further FIG. 3B illustrates the case of multicast communicating by password transmission paper document B to reception terminals D(3) and D(4). In this case, the multicast communication is prepared according to the flow chart illustrated in FIG. 7C.

As described above, a plurality of multicast communication are sequentially registered by one or plurality of users at a communication apparatus before the early registered multicast communication is not finished. The sequence is explained in the following, assuming job A and job B are registered as illustrated in FIG. 1B.

Figure 8:
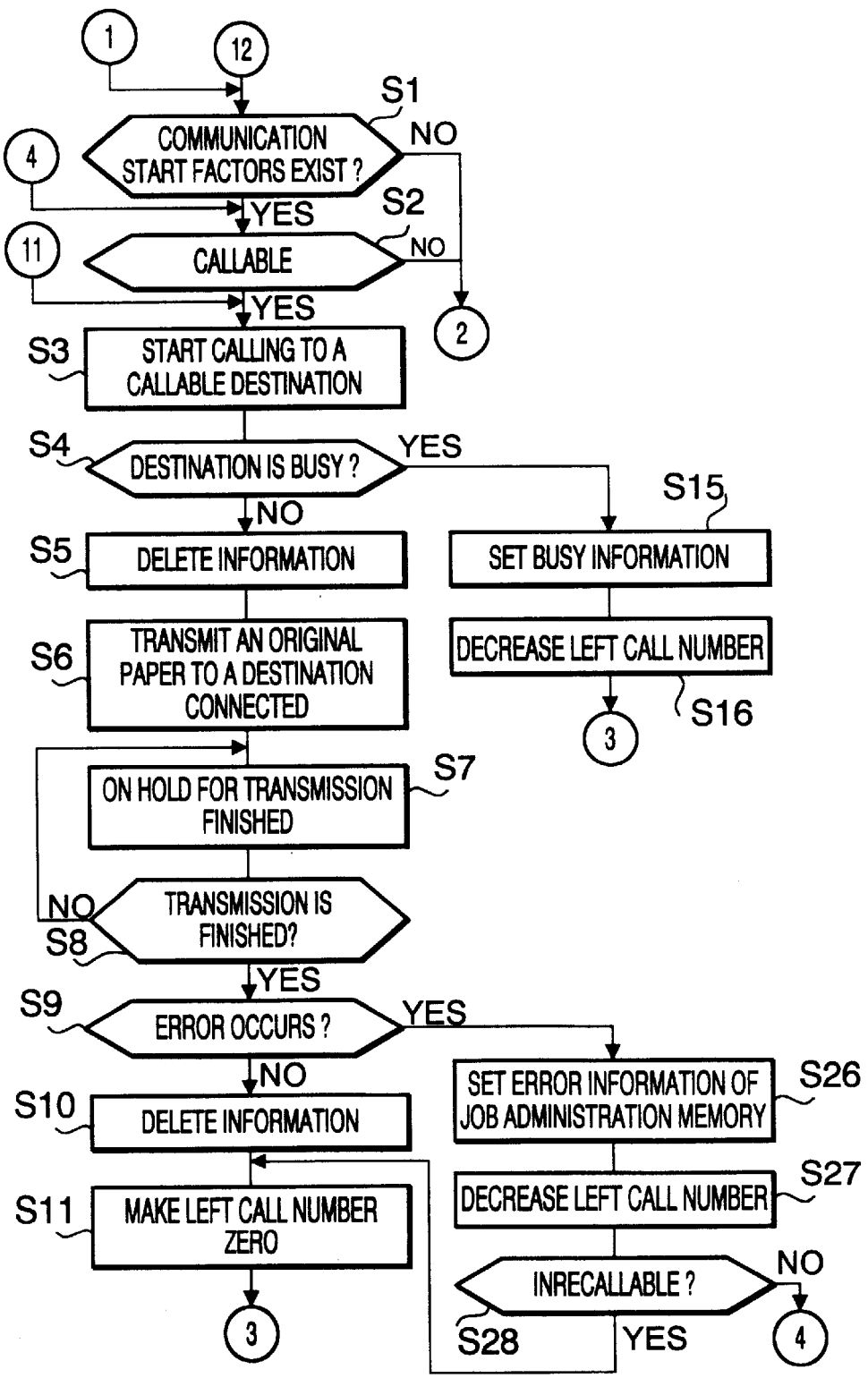
FIG. 8 is a flow chart illustrating a part of a multicast communication in the above embodiment of the present invention.
Figure 9:
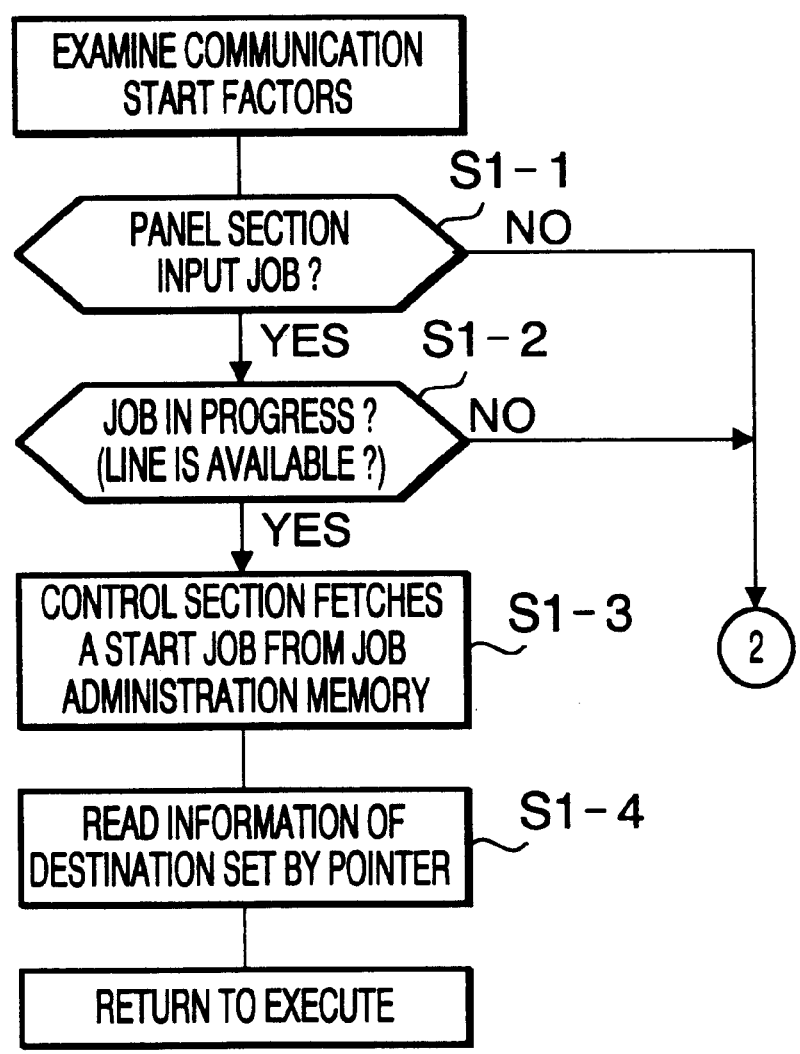
FIG. 9 is a flow chart to examine the communication start factors in a multicast communication in the above embodiment of the present invention.

Control section 5 examines the communication start factors at the processing of step S1 illustrated in FIG. 8. FIG. 9 illustrates a flow chart for the to examine the communication start factors. When a registration of a multicast communication is required from panel section 4 (S1-1), control section 5 decides whether or not the line is available (S1-2). When the line is available, it reads job administration file A of job A ( job to start) from job administration memory 3 (S1-3) and acquires the information of destination D(1) at which a pointer of call destination is set (S1-4).

Figure 10:
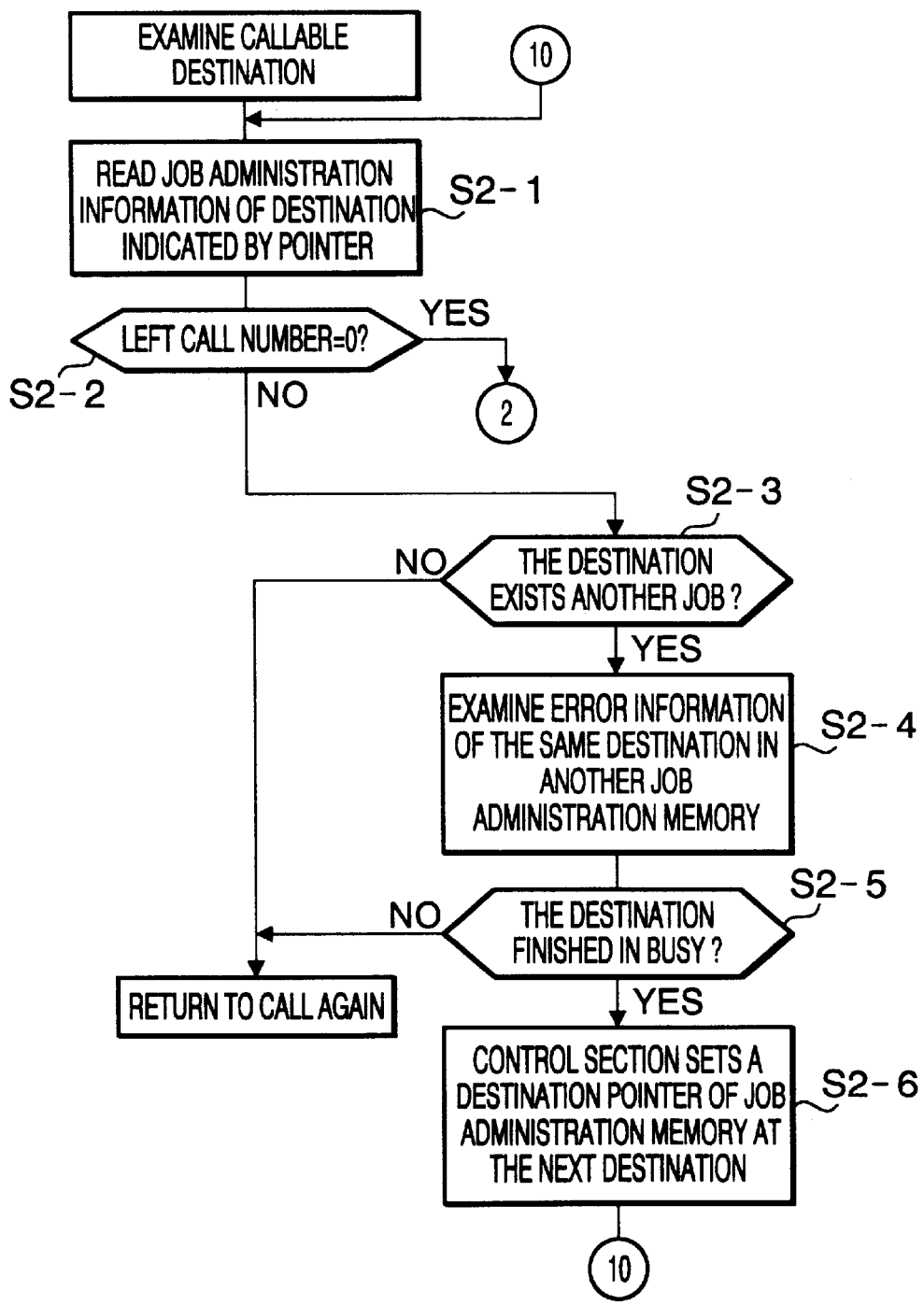
FIG. 10 is a flow chart to examine callable destinations in a multicast communication in the above embodiment of the present invention.
Figure 11:
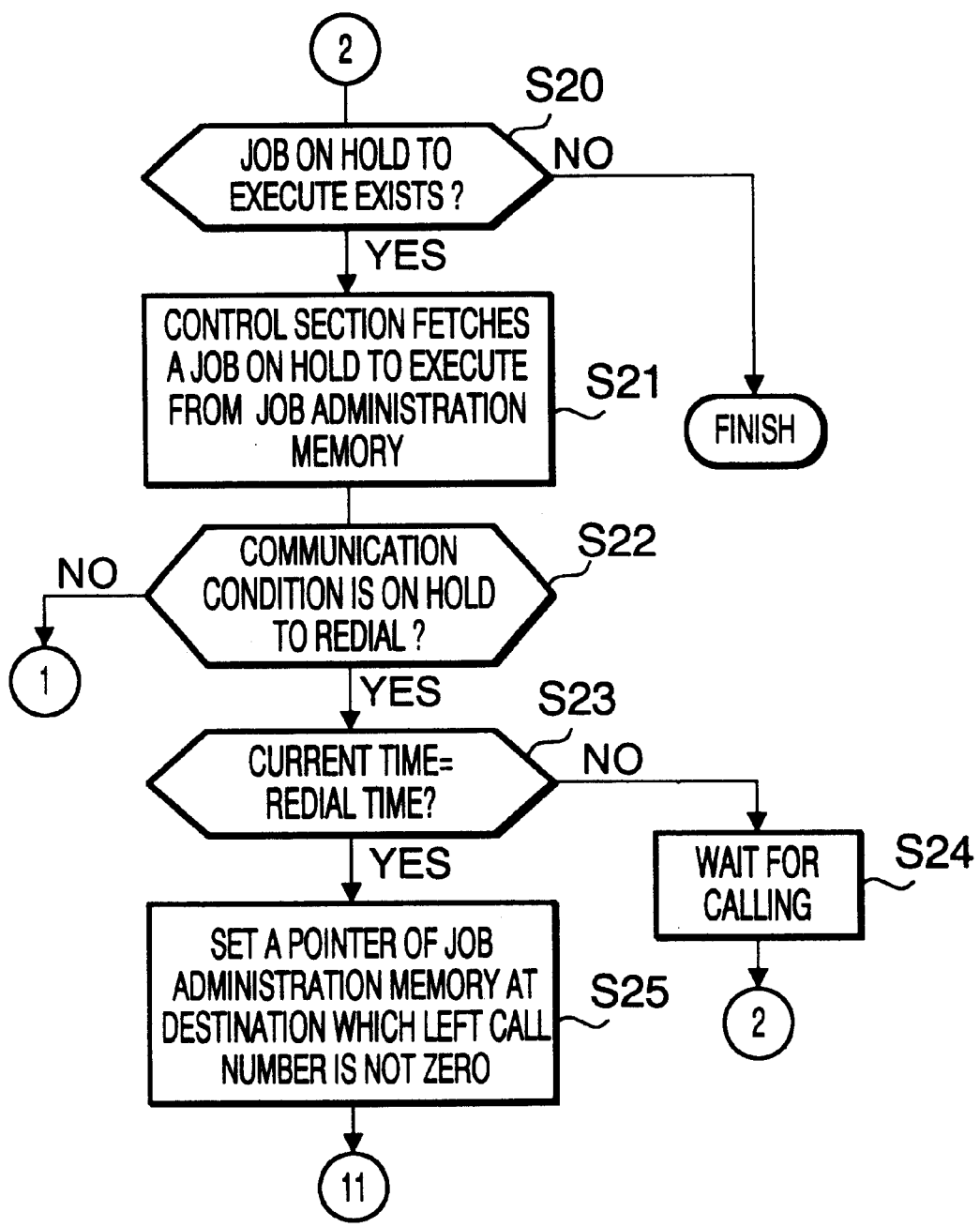
FIG. 11 is a flow chart illustrating another part of a multicast communication in the above embodiment of the present invention.

Next it is decided whether or not a destination is proper for a call at the processing of step S2 illustrated in FIG. 8. FIG. 10 illustrates a flow chart to examine the callable destinations. In job A capable of communicating, the information of destination D(1) set by a pointer is read from destination administration memory 3 (S2-1). In the case of a series of processing from step S1 described above, the job administration information of the destination set by a pointer is acquired at the processing of step S1-4. The left call number of destination D(1) is examined using the job administration information (S2-2). In this case, since the first call is performed at all jobs, the left call number keeps the initial value. Next it is examined whether or not destination D(1) is registered in another job, i.e. job B (S2-3). The error information of destination D(1) at the job administration file of another job registered currently, i.e. job B (S2-4). It is examined whether or not a call to destination D(1) performed in (another job, i.e.) job B, is finished in a busy condition (S2-5). In this case, since a call is performed first, it is confirmed that a call to destination D(1) performed in (another job, i.e.) job B, is not finished in a busy condition. Accordingly it is decided that destination D(1) is proper for a call, in job A. That is to say, destination D(1) is callable.

At the processing of step S3, a call is started to callable destination D(1). A call result of destination D(1) is detected (S4), then when destination D(1) is not in busy and the line connection is established, the error information of destination D(1) at job administration file A of job A stored at job administration memory 3 is deleted (S5). After CED detection, paper document A is transmitted to destination D(1) connected via transmitting and receiving section 9 (S6). When it is detected that the transmission is finished (S8), the presence or absence of communication error occurred is examined (S9). In the case where the communication is completed without any communication error, the error information of destination D(1) is deleted (S10), and the left call number of destination D(1) at job administration file A of job A is changed to zero (S11).

It is decided whether or not the left call number of all destinations in job A just finished are zero (S12). In this case, since a call to destination D(1) is the first one in job A, the left call number of destination D(2) still keeps the initial value (=3). Control section 5 sets a destination pointer in job administration file of job A at the next destination D(2) (S13).

FIG. 14 illustrates the conditions of job administration file A and B when the processing of step S13 is finished. As illustrated in the figure, in job administration file A processed as described above, "completed" is set for the error information of destination D(1) according to the communication result, and a pointer is set at destination D(2). In addition, job administration file B of job B keeps the initial settings.

Next it is decided whether or not a destination pointer is set at the first destination in job A (S14). In this case, it is set at destination D(2) which is not the first one as illustrated in FIG. 14. Then the sequence shifts to step S2 described above, and it is decided whether or not destination D(2) is proper for call in the same manner as the case of destination D(1). Since a call to destination D(2) is the first one in both job A and another job, i.e. job B, as well as former destination D(1), and not in a busy condition, it is decided that destination D(2) is callable.

An example in FIG. 1B illustrates the case where a call to destination D(2) is performed in job A and the connection is not established because of the busy condition. In this case at step S4, it is decided that the destination is in busy, and the busy information is set for destination D(2) at job administration file A at job administration memory 3 (S15). The left call number of destination D(2) at job administration file A is made two by decreasing one from the initial value (S16). Shifting to the processing of S12, it is examined whether or not the left call numbers of all destinations registered in job A are zero (S12). In this case, since the left call number of destination D(2) at job administration file is two, a destination pointer is set at the next destination D(1) in job A (S13).

Since destination D(1) set by a pointer this time is the first one in job A, it is decided that a series of calls to destinations registered in job A is finished (S17). After the redial time is set (S18), the redial interval is set at the communication condition at job administration file A (S19).

After the redial interval is set to job A, it is examined whether or not a job to execute is registered at job administration memory 3 (S20). In this case, job B is registered to execute, control section 5 fetches the job administration information of job B to execute from job administration memory 3 (S21). The communication condition set at job administration file B is examined (S22), and if the condition is not in the redial interval, the same call sequence as that for job A is executed by shifting to step S1 described above.

The communication start factors for job B are examined, job B input from panel section 4 is read as a start job from job administration memory 3, and destination information (D(2)) set by a destination pointer at job administration file B is read out (S1).

In the examination of callable destinations, the left call number of destination D(2) set by a destination pointer is examined from job administration file B (S2-2). Since a call to destination D(2) is the first one in job B and the left call number of destination D(2) is still the initial value, the processing is shifted to step S2-3, and it is decided whether or not destination D(2) presents in anther job, i.e. job A. Since destination D(2) presents in job A, the error information of destination D(2) at job administration file A of job A is examined (S2-4). As a result, it is found that destination D(2), set by a destination pointer in job B, is finished in a busy condition in job A (S2-5). Because of it, it is decided at this point that destination D(2) is improper for call, and a destination pointer at job administration file B is set at the next destination D(3) (S2-6).

To destination D(3) newly set by a destination pointer, the callable destination examination is perfrmed according to step S2. Since a call to destination D(3) is the first one in all jobs, it is decided that the destination is callable. Accordingly in job B, a call to destination D(2), which is finished in a busy condition in job A, is skipped, then a call is first initiated to destination D(3) (S3). By this manner, in the case where a destination, to which a connection is not established in the previous job, is included in the later job, since the call order to the destination lowers in the later job, a call to the destination, to which a connection is not established in the previous job, can be performed after the possibility to establish the connection to the destination increases.

FIG. 14B illustrates the conditions of job administration files A and B when a call to destination D(2) is finished in a busy condition in job A, and a call to destination D(3) is performed in job B. As illustrated in the figure, in job administration file A processed as described above, "busy" is set for the error information of destination D(2) according to the communication result. The error information of destination D(2) skipped in job administration file B keeps the initial settings.

In an example illustrated in FIG. 1B, since a transmission to destination D(3) is completed, "completed" is set for the error information of destination D(3) of job administration file B, while the left call number is set at zero, as illustrated in FIG. 14C.

In job B, after a transmission to destination D(3) is completed, a destination pointer is set at destination D(2) at the head in job administration file B. The processing is shifted from step S14 to step S17, it is decided whether or not a call to destination D(2) set by a destination pointer is first one in job B. In job B, since a call to destination D(2) is first one, the callable destination examination is not performed (S2), and a call to destination D(2) is initiated (S3).

An example (illustrated) in FIG. 1B illustrates the case where a transmission to destination D(2), which is once skipped in job B, completed. "Completed" is set for the error information of destination D(2) at job administration file B as illustrated in FIG. 15A, and the left call number is set at zero.

At step S11 in executing job B, by setting the left call number of destination D(2) of job administration file B at zero, it is decided the left call numbers of all destinations, i.e. D(2) and D(3) are zero (S12), the processing is shifted to step S20.

Since job A is on hold to execute (S20), job administration file A of job A is read from job administration memory 3 (S21). By examining the communication condition at job administration file A, it is found a redial interval is set (S22). The current time is compared to the redial time (S23), and when there is a time until the redial time, it is examined whether or not another job to execute is left at step S20. In the example illustrated in FIG. 1B, since no job to execute presents, no call is performed until the redial time.

When it is the redial time, a destination pointer of job administration file A is set at destination D(2) which left call number remains, and a call is performed to destination D(2) without executing the callable destination examination at step S2 (S3).

At an example illustrated in FIG. 1B, since a connection to destination D(2) is established and completed, the left call number of destination D(2) at job A is made zero at step S11. FIG. 15B illustrates the conditions of job administration files A and B when a communication to destination D(2) is completed in job A.

When it is recognized that the left call numbers of all destinations in job A are zero, job A is finished. Further after it is confirmed at step S20 that no job on hold presents, a series of multicast communications is finished.

As described above, the destination (D(2)), to which a connection is not established in job A because of the busy condition, is memorized, in the case where the destination (D(2)) to be called in another multicast communication, i.e. job B, is already detected as in busy, a call is performed to the next registered destination by skipping the destination (D(2)). That allows to primarily communicate to a destination which connection possibility is relatively high, to decrease the duration time to finish job B compared to the conventional method, and to decrease the total duration time to finish job A and job B.

And since a call to a destination skipped when the job starts is performed after a call to a destination not skipped, the communications to all destinations or many destinations in the job may be finished during the redial interval of the already executed job, which permits to reduce the duration time to finish transmitting.

Figure 12:
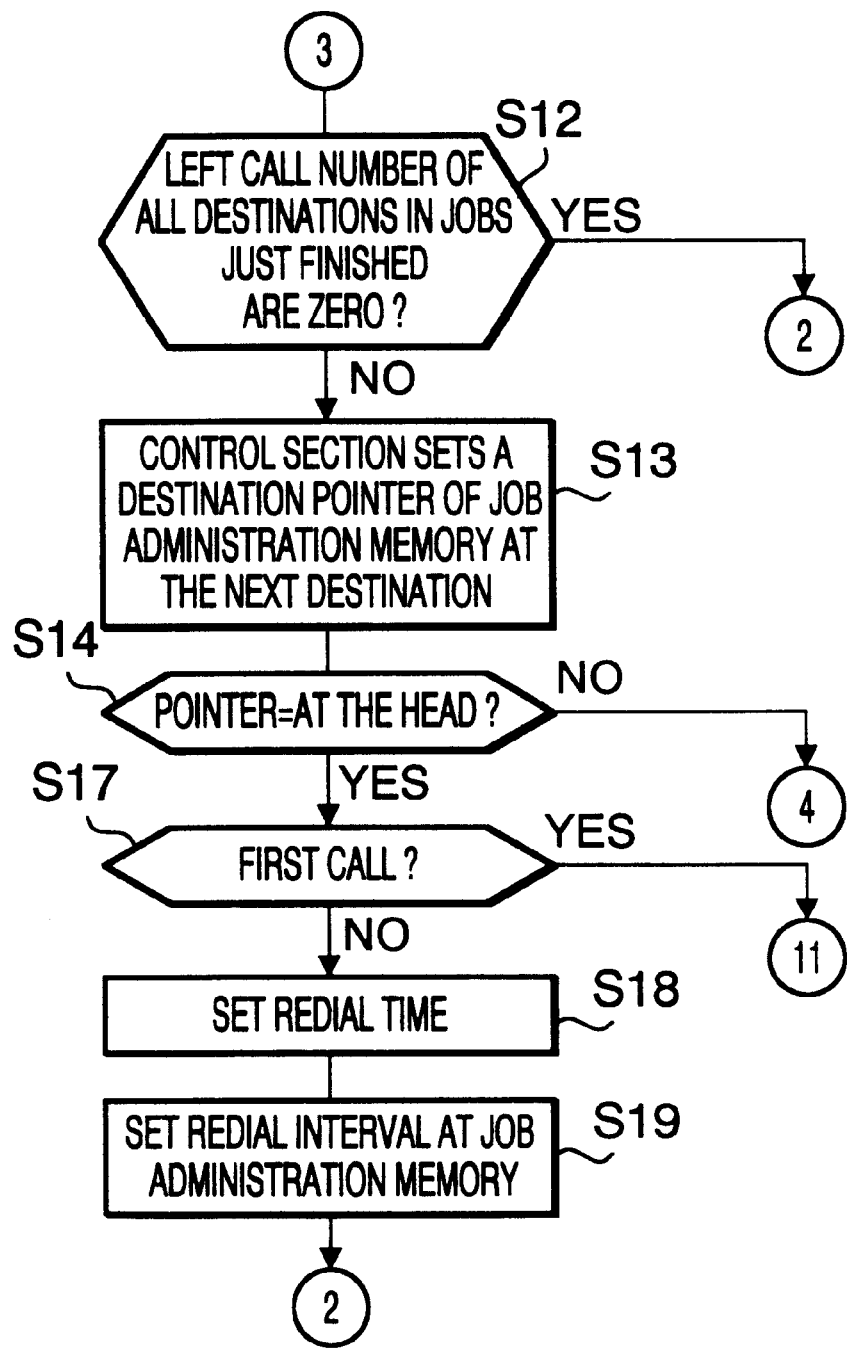
FIG. 12 is a flow chart illustrating another part of a multicast communication in the above embodiment of the present invention.

By the way, to achieve the call sequence illustrated in FIG. 2B, it is necessary to provide a control based on the flow chart in FIG. 13 replaced with the flow chart in FIG. 12. That is, in job B, after a call to destination D(2) at the head is skipped, a transmission to the next destination D(3) is completed and the left call number of destination D(3) is made zero (S11), the processing is shifted to step T1 and it is decided whether or not the left call numbers of all destinations registered in job B are zero. In the case where a call is not performed to some destination, a destination pointer is set at the next destination (T2), because a destination which left call number is not zero exists. After a transmission to the destination registered at the last in job B is finished, a destination pointer is set at the first destination, which means it once rounds all destinations including the skipped one. In the case where a destination pointer is set at the first destination (T3), the redial time is set without calling to the skipped destination (T4) and the redial interval is set for the communication condition of job administration file B (T5).

As illustrated in FIG. 2B, when it is redial time after the redial interval of job A finishes, a call is performed to a destination D(2) set by a destination pointer in job A (S3). When a transmission to destination D(2) is completed in job A, the error information of destination D(2) in job administration file A is changed to "completed". Then job B starts and a call is performed by setting a destination pointer at destination D(2).

In the manner described above, in the case where a destination pointer is set at the first destination (T3), the redial time is set without calling to the skipped destination (T4), and the redial interval is set for the communication condition of job administration file B (T5). Because of it, a call to a destination detected as busy is performed again after enough time passes, which improves to establish the connection.

Next as illustrated in FIG. 3B, the case where a communication error occurs in the middle of the multicast communication is explained.

In FIG. 3B, a communication error caused by the line termination occurs during the transmission to destination D(2) in job A, the occurred error is detected at the processing of step S9, and "line termination" is set for the error information of destination D(2) at job administration file A (S26). FIG. 16A illustrates the conditions of job administration files A and B after a call to destination D(1) is finished in job A. FIG. 16B illustrates the conditions of job administration files A and B after the first call to destination D(2) is finished in job A.

At step S27, after the left call number of destination D(2) at job administration file A is decreased, it is decided whether or not the communication error is caused by the reason proper to call again (S28). For instance, in the case where the communication error is caused by the line termination, it is assumed that the possibility to connect and complete the communication is high. And in the case where a communication error is caused by the improper password in the password transmission, it is obvious that establishing the communication is impossible by calling again.

Since the content of communication error is memorized as an error information at job administration file A, the error information of destination D(2) at job administration A is examined. In the case illustrated in FIG. 3B, "line termination" is set, it is decided recallable at step S28 and the processing is shifted to step S2. FIG. 16C illustrates the conditions of job administration files A and B when a communication to destination D(2) is completed in job A.

On the other hand, in the example illustrated in FIG. 3B, a communication error is caused by the improper password when a call is performed to destination D(3) in job B. At step S26, "improper password" is set for the error information of destination D(3) at job administration file B, and the left call number is decreased. At step S28, it is decided whether or not a call should be performed again. In the case where the error type shows "improper password", it is decided a call should not be performed again, the processing is shifted to step S1, and the left call number of destination D(3) is set at zero. By this manner, a call to destination D(3) is not performed because its left call number is zero even when a destination pointer is set at destination D(3) in the following processing. FIG. 17A illustrates the conditions of job administration files A and B when a communication error is caused by "improper password".

As illustrated in FIG. 3B, when a call to destination D(3) is terminated by a communication error caused by "improper password", a destination pointer is set at the next destination, i.e. destination D(4), immediately, and a call is performed to destination D(4). FIG. 17B illustrates the conditions of job administration files A and B when a communication to destination D(4) is finished.

According to the manner described above, when a communication error occurs to a destination, the error type is examined. In the case where the error is caused by the recommunicatable reason, a call to the same destination is performed again immediately. In the case where the error is caused by the inrecommunicatable reason, the left call number is set at zero so that a call is not performed later. That saves useless calls caused by calling to an inrecommunicatable destination repeatedly, and allows to reduce the duration time to finish the job. When it is applied to the case where two multicast communications are alternatively performed using the redial interval, in the case where a communication error is caused by an inrecommunicatable reason in a multicast communication, a call is shifted to the next (destination) without repeating the predetermined call number. That permits to reduce the duration time to complete the whole multicast communications including other multicast communications.

What is claimed is:

1. A method for performing a plurality of multicasts, each of the plurality of multicasts attempting to establish a line connection to a plurality of destinations, the plurality of destinations of each multicast being independently determined, at least two of the plurality of multicasts having at least one common destination, the method comprising:

storing each destination to which a line connection is not established in each multicast;

deciding whether a destination to which an attempt is to be made to establish a line connection in a current multicast is a stored destination to which a line connection was not established in a previous multicast, and advancing to a subsequent destination in the current multicast without attempting to establish a line connection by calling to the stored destination to which a line connection was not established in the previous multicast.

2. The method according to claim 1, further comprising:

in a current multicast, attempting to establish a line connection to the destination to which a line connection was not established after a communication to the subsequent destination in the current multicast is completed.

3. The method according to claim 1, further comprising:

in the current multicast, shifting a call order backwards for the destination to which a line connection is not established.

4. The method according to claim 1, further comprising:

setting a redial interval for the destination to which a line connection was not established and, during the redial interval, attempting to establish a line connection to a subsequent destination in the current multicast without again attempting to establish a line connection by calling to the destination to which a line connection was not established, until after a communication to the subsequent destination is completed.

5. The method according to claim 1, wherein said method further comprises: setting a redial interval for the destination to which a line connection was not established and, during the redial interval, not again attempting to establish a line connection by calling to the destination to which a line connection was not established.

6. The method of performing a plurality of multicasts according to claim 1, further comprising:

predetermining each of the plurality of destinations of each multicast.

7. A method for performing a plurality of multicasts, each of the plurality of multicasts attempting to call a plurality of destinations, the plurality of destinations of each multicast being independently determined, at least two of the plurality of multicasts having at least one common destination, the method comprising:

detecting an occurrence of a communication error with respect to a destination of a multicast;

identifying an error type of the detected communication error;

attempting to call again to the destination when the error type is identified as recommunicatable, and advancing to a subsequent destination in the multicast without attempting to call again to the destination when the error type is identified as irrecommunicatable; and finishing a current multicast communication and shifting to a next multicast communication without attempting to call the destination when the error is irrecommunicatable.

8. The method according to claim 7, further comprising:

in a case where a communication error caused by a line termination is detected, identifying the error type as a recommunicatable one.

9. The method according to claim 7, further comprising:

identifying the error type as an irrecommunicatable one when a communication error caused by an improper password is detected.

10. The method of performing a plurality of multicasts according to claim 7, further comprising:

predetermining each of the plurality of destinations of each multicast.

11. A communication apparatus for performing multicasts comprising:

a system that performs a plurality of multicasts, each multicast attempting to call a plurality of destinations, the plurality of destinations of each multicast being independently determined, at least two of the plurality of multicasts having at least one common destination;

a system that sets a redial interval with respect to each destination to which a line connection is not established;

a memory that registers error information concerning each destination to which a line connection is not established;

a system that deletes the registered error information of a destination to which a line connection is completed;

a system that starts a second multicast during the redial interval; and a system that controls a call order in a current multicast to attempt to call a destination of which no error information is registered in the memory such that, when error information of a first destination is registered in the memory, a call is attempted to a subsequent destination in the current multicast without attempting to call the first destination.

12. A communication apparatus for performing multicasts comprising:

a system that performs a plurality of multicasts, each multicast attempting to call a plurality of destinations, the plurality of destinations of each multicast being independently determined, at least two of the plurality of multicasts having at least one common destination;

a system that sets a redial interval for a destination to which a line connection is not established in a first multicast;

a system that starts a second multicast during a redial interval;

a memory that registers an error type of a communication error that occurred for a destination to which a line connection is not esablished; and a system that blocks a call attempt to a destination of which the error type is registered as irrecommunicatable, finishes a current multicast by completing remaing calls to subsequent destination in the current multicast and shifts to a next multicast without attempting to call the destination having an error registered as irrecommunicatable.

13. A communication apparatus for performing a plurality of multicasts, each attempting to call a plurality of destinations, the plurality of destinations of each multicast being independently determined, at least two of the plurality of multicasts having at least one common destination, the apparatus comprising:

a system that performs a multicast to send paper document data to a plurality of destinations;

a system that sets a redial interval for a destination to which a line connection is not established in a multicast; and a system that controls a call order such that when a destination with a redial interval set in a previous multicast is included in the destinations of a current multicast, advances to a next destination in the current multicast without attempting to call the destination with the set redial interval.

14. The communication apparatus according to claim 13, wherein the plurality of destinations of each multicast are predetermined.

15. A communication apparatus for performing a plurality of multicasts, each attempting to call a plurality of destinations, the plurality of destinations of each multicast being independently determined, at least two of the plurality of multicasts having at least one common destination, the apparatus comprising:

a system that performs multicasting to send a same paper document data to a plurality of destinations;

a memory that registers error type information concerning a destination to which a line connection is not established in a multicast;

a system that controls a current multicast to advance to a subsequent destination of the plurality of destinations without attempting to call a destination of which an error type is registered as irrecommunicatable, and that finishes a current multicast without attempting to call the destination of which an error type is registered as irrecommunicatable; and a system that shifts to a next multicast after finishing the current multicast.

* * * * *